Aug. 16, 1932.  J. R. PADESKY  1,871,552
INSTRUMENT PANEL BOARD
Original Filed July 28, 1928
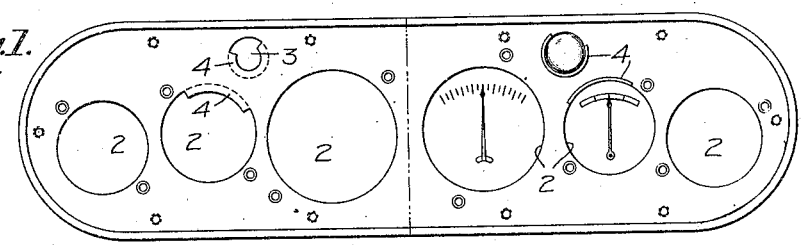
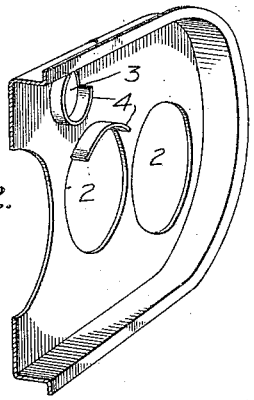
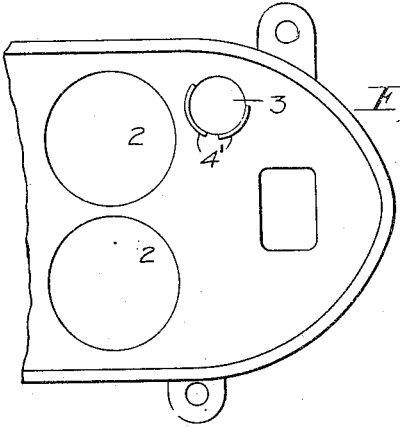
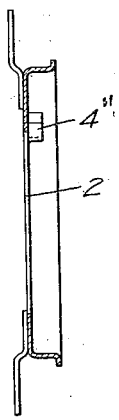
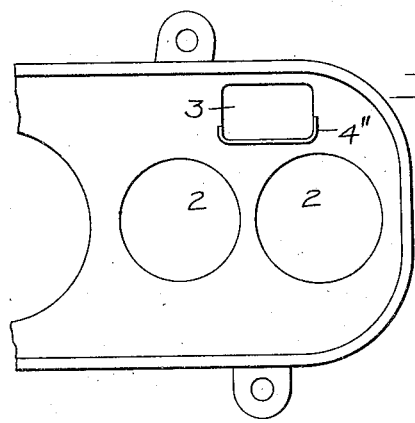
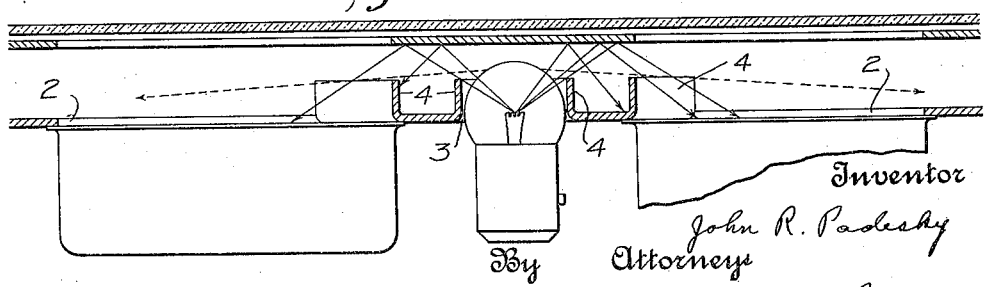
Inventor
John R. Padesky
By Attorneys
Nathan & Bowman Patented Aug. 16, 1932

1,871,552

UNITED STATES PATENT OFFICE

JOHN R. PADESKY, OF LA CROSSE, WISCONSIN, ASSIGNOR TO MOTO METER GAUGE & EQUIPMENT CORPORATION, OF NEW YORK, N. Y., A CORPORATION OF DELAWARE

INSTRUMENT PANEL BOARD

Original application filed July 28, 1928, Serial No. 295,947. Divided and this application filed December 21, 1929. Serial No. 415,682.

This invention relates to instrument panel boards—particularly those used on motor cars and is a division of application #295,947 filed July 28, 1928, which resulted in Patent No. 1,749,353 issued March 4, 1930.

For a number of years the effort has been to arrange the electric light and instruments on an instrument panel board in such a manner that the light will be concealed and the rays of light be diffused upon the dial of instruments with a soft and uniformly diffused effect, avoiding all the glare incident to the direct and concentrated rays of light. Various arrangements have been tried including the use of shields placed about the instrument openings, but these arrangements were such that the direct rays of light were not properly focused and the reflected rays of light were not evenly diffused. It has been particularly desirable in some cases to divert all the direct rays and prevent them from reaching adjacent instrument dials; but it has been difficult in such cases to procure the desirable soft light throughout the instrument board of such character as to furnish the proper lighting effects.

To accomplish the foregoing results it has been found necessary to arrange a shield about the light opening which would focus the rays of light upon a limited amount of the reflecting surface of the casing and covering and it has been found advantageous to direct these focused rays of light upwardly and away from the instrument opening by the addition of other shields of similar conformation with the shield placed about the light opening while other shields are placed about some of the instrument openings.

In the illustrations of this invention there is properly arranged a shield of concavo convex form surrounding the major part of the light opening and forming a continuation of the wall surrounding the light opening and adjacent to this light opening shield also there is a shield of concavo convex form extending around a limited part of the instrument opening, the convex faces of the two shields being placed one facing the other. In this manner the rays of light from the electric light are focused upon a limited amount of the reflecting surface and the concentrated reflected rays from this limited reflecting surface are diverted from the instrument opening by the shield which partially surrounds the instrument opening and thereby enables the constructor of the panel board to glaze the reflecting surfaces of the covering, presenting an illumination of a desirable soft and even glow. It will be pointed out that the direct rays of light are diverted from the instrument opening by the shield about the light opening while the more direct reflected rays of light are diverted from the instrument opening by the shield positioned around said instrument opening.

In a general way these objects are accomplished by first forming the panel plate with irregular openings and thereafter bending the off-set portion to form the shield, thereby at the same time producing a substantially circular opening with a shield or wall projecting at right angles to the face of the panel and extending partially around said opening.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawings depicting preferred typical constructions have been annexed as a part of this disclosure and, in such drawing, like characters of reference denote corresponding parts throughout all the views, of which:—

Figure 1 is a front view of the panel showing the partly formed light openings on the left side and the completely formed light openings on the right side thereof; there being shown only one instrument opening with a shield partly inclosing said opening, but obviously shields may be applied in this same manner to other instrument openings. Fig. 2 is a perspective view, parts of the panel being broken away. Fig. 3 is a similar view of the front of the panel showing non-continuous shields about the light opening. Fig. 4 is a front view or modification and Fig. 5 is a left end view of Fig. 4 while Fig.

6 is a diagrammatic view disclosing the direction of some of the rays of light emitted by the electric light.

Referring to Fig. 1 the panel is marked 1, the instrument openings are marked 2 and the light opening is marked 3. The off-set portion 4 extending about the light opening 3 extends preferably around substantially ⅔ of that circular opening and when the off-set portion is turned up at right angles to the panel as indicated on the right hand side of Fig. 1, this up-turned portion which has been termed a shield has a dual function. It both prevents the direct rays of light from falling upon the instrument dial and also focusses the direct rays upon a limited surface of the casing and covering. In this manner the direct rays of light are prevented from being scattered over the reflecting surfaces, thereby localizing the point where the rays of light are reflected downward. The shield 4 which is positioned about a small part of the opening for the instrument is so positioned in its relation to the shield about the electric light opening that it will prevent the concentrated reflected rays of light from being thrown upon the dial of the instrument within the opening 2. Consequently, the only light which can be thrown upon the dial of the instrument placed within the opening 2 are the reflected rays that have become diffused and this brings about a more soft and uniform glow than would otherwise occur if the direct rays of light were not first focussed upon a limited amount of the reflecting surface and then the instrument openings protected from those concentrated indirect rays of light. In the modification of Fig. 3 the shield surrounding the light opening 3 is shown divided into two parts 4' which extend along the perimeter of the light opening 3 between that opening and adjacent instrument openings. In the modification shown in Fig. 4 the light opening 3 is rectangular and the shield 4'' extends for a portion of the perimeter of the light opening between that opening and adjacent instrument openings.

It will now be apparent that the set of shields placed about the light opening and the instrument opening are so positioned that the convex surfaces of the respective shields face one another and the concave surfaces surround the walls of the respective openings, and it is also apparent that in this manner the direct rays of light are not permitted to be scattered over any extended amount of the reflecting surface and that the reflected rays of light are in large part diverted from the adjacent instrument opening until they have been re-reflected, thereby bringing about the desired result.

Without further analysis the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of the United States:—

In a panel board for instruments the combination of a light member with a plurality of instruments, a cover plate forming an enclosure with said panel board, the light being projected to the inside of said enclosure thereby concealing the light from the front of said panel, a plurality of openings in said panel board, the light member and instruments being insertable within said openings, shields of a concavo-convex character secured around some of said openings, one of said shields partially surrounding the light opening and another the instrument opening, the convex surfaces of same shields being adjacent one to the other whereby the direct rays of light will be restricted to a predetermined place by the first mentioned shield and the reflected rays be diverted by the second mentioned shield.

In witness whereof, I have hereunto subscribed my name.

JOHN R. PADESKY.